US009268509B2

(12) United States Patent
Darragh

(10) Patent No.: US 9,268,509 B2
(45) Date of Patent: Feb. 23, 2016

(54) AUTOMATED COMPUTER CONTROLLED SYSTEM FOR MEASURING THE CONSUMPTION OF PRINTER RESOURCES AND TRANSACTING ENVIRONMENTAL OFFSETS

(71) Applicant: PrintReleaf, Inc., Denver, CO (US)

(72) Inventor: Jordan Darragh, Lafayette, CO (US)

(73) Assignee: PRINTRELEAF, INC., Denver, CO (US)

( * ) Notice: Subject to any disclaimer, the term of this patent is extended or adjusted under 35 U.S.C. 154(b) by 0 days.

(21) Appl. No.: 14/539,922

(22) Filed: Nov. 12, 2014

(65) Prior Publication Data

US 2015/0205546 A1 Jul. 23, 2015

Related U.S. Application Data

(60) Provisional application No. 61/903,174, filed on Nov. 12, 2013.

(51) Int. Cl.
*G06F 3/12* (2006.01)
*G06Q 30/06* (2012.01)

(52) U.S. Cl.
CPC ............ *G06F 3/1218* (2013.01); *G06F 3/1229* (2013.01); *G06Q 30/06* (2013.01)

(58) Field of Classification Search
CPC ... G06F 3/1204; G06F 3/1221; G06F 3/1239; G06F 3/1254; G06F 3/1285; G06F 3/1218; G06F 3/1229; G06Q 10/06; G06Q 10/063; G06Q 10/10; G06Q 40/12; G06Q 50/06; G06Q 30/06; Y02B 60/1271
USPC ....................................................... 358/1.15
See application file for complete search history.

(56) References Cited

U.S. PATENT DOCUMENTS 6,310,692 B1  10/2001  Fan et al.
6,876,980 B2   4/2005  Reid et al.
7,768,666 B2   8/2010  Okamoto et al.
8,260,672 B2   9/2012  Weel et al.

(Continued)

OTHER PUBLICATIONS

International Search Report dated Feb. 19, 2015 for International Application No. PCT/US14/65301, 3 pp.

(Continued)

*Primary Examiner* — Iriana Cruz
(74) *Attorney, Agent, or Firm* — James A. Sheridan; Sheridan Law, LLC

(57) ABSTRACT

There is disclosed an automated computer controlled system for measuring the consumption of printer resources and transacting environmental offsets, and may comprise a printer resource tracking system (PRTS) collecting resource consumption data from printing equipment. A transactional server may retrieve the resource consumption data from the PRTS. A consumed resource associated with a customer may be consumed by the printing equipment downstream of a supplier of the printer resources. An offset project may communicate with the transactional server and be capable of planting an environmental offset upstream of the supplier and offset an environmental impact of the consumed resource. A scaling factor may be dependent on distinctive characteristics of at least one offset project. A calculator may apply the scaling factor to the consumed resource to calculate the environmental offset. A user interface may present to the customer an option to order the environmental offset from an offset project.

26 Claims, 15 Drawing Sheets

(56) References Cited

U.S. PATENT DOCUMENTS

| | | |
|---|---|---|
| 8,330,984 B2 | 12/2012 | Scaff |
| 2002/0099630 A1 | 7/2002 | Aruga et al. |
| 2003/0174356 A1 | 9/2003 | Cherry et al. |
| 2004/0249757 A1 | 12/2004 | Walmsley et al. |
| 2005/0052684 A1 | 3/2005 | Ferlitsch |
| 2005/0286068 A1 | 12/2005 | Johnson et al. |
| 2008/0037057 A1 | 2/2008 | Caffary, Jr. |
| 2009/0313145 A1* | 12/2009 | Hamilton et al. ............... 705/30 |
| 2009/0319905 A1* | 12/2009 | Loeb et al. .................... 715/736 |
| 2010/0328719 A1 | 12/2010 | Miller |
| 2013/0073333 A1 | 3/2013 | Weel et al. |

OTHER PUBLICATIONS

Written Opinion dated Feb. 19, 2015 for International Application No. PCT/US14/65301, 5 pp.

* cited by examiner

PrintReleaf End Customer Dashboard (User Interface)

My Projects

| DOMINICAN REPUBLIC | MADAGASCAR | BRAZIL | ETHIOPIA |
|---|---|---|---|
| PLANT WITH PURPOSE | The Eden Projects | WeForest | The Eden Projects |

Browse all projects >

— 156

My Forest

View all certificates >

| DATE | PROJECT | PAGES | TREES |
|---|---|---|---|
| 03/31/2014 | Ethiopia | 15,085 | 1.81 |
| 03/31/2014 | Mexico | 15,087 | 1.81 |
| 03/31/2014 | Burkina Faso | 15,085 | 1.81 |
| 03/31/2014 | Dominican Republic | 15,085 | 1.81 |
| 02/28/2014 | Dominican Republic | 26,448 | 3.17 |
| 02/28/2014 | Burkina Faso | 26,448 | 3.17 |

PrintReleaf End Customer Reforestation Project Allocation & Certificate Database

FIG. 6C

Tree Species

Conv. Efficiency ∝ 1 / Survival

| PROJECT | NAME | SURVIVAL | WIDTH | HEIGHT | STES | UNIT PRICE | STE PRICE |
|---|---|---|---|---|---|---|---|
| Brazil<br>WEFOREST | Cordia trichotoma | 90% | 0.39 | 25.00 | 9.87 | $1.0000 | $0.1014 |
| Burkina Faso<br>WEFOREST | Faidherbia Albida | 65% | 0.61 | 20.00 | 19.31 | $1.0000 | $0.0518 |
| Mexico<br>PLANT WITH PURPOSE | Pinus michoacana | 70% | 0.50 | 28.04 | 18.19 | $1.0000 | $0.0550 |
| Dominican Republic<br>PLANT WITH PURPOSE | Pinus occidentals | 85% | 0.70 | 30.02 | 38.17 | $1.0000 | $0.0262 |
| Ethiopia<br>EDEN PROJECTS | Hagenia abyssinia | 66% | 0.90 | 15.00 | 31.52 | $0.1000 | $0.0032 |
| Madagascar<br>EDEN PROJECTS | Rhizophora mucronatta | 65% | 0.60 | 25.00 | 23.35 | $0.1000 | $0.0043 |

Conversion Pricing and Project-Specific Scaling

FIG. 9

Contextual Data Showing Forest Gain/Loss

Admin Dashboard Showing Future Commitments

Manage Customers

All Customers | | | ADD CUSTOMER

| Name | DATA PROVIDER | CURRENT PAGES | STATUS |
|---|---|---|---|
| ABC DEMO Customer | | 0 | INACTIVE |
| Anton Collins Mitchell LLP | PrintFleet | 109,580 | ACTIVE |
| Array Biopharma | PrintFleet | 8,411 | ACTIVE |
| BKD | PrintFleet | 1,89 | ACTIVE |
| CDP Customer | PrintFleet Manual Entry | 0 | DEACTIVATED |
| demo2 | | 0 | INACTIVE |
| Duke Energy | | 0 | INACTIVE |
| Emerson | PrintFleet | 306,244 | ACTIVE |
| Fairmount Minerals | PrintFleet | 313,919 | ACTIVE |
| Geneos Wealth Management | PrintFleet | 35,685 | ACTIVE |

Customer Management Admin Portal

FIG. 13

AUTOMATED COMPUTER CONTROLLED SYSTEM FOR MEASURING THE CONSUMPTION OF PRINTER RESOURCES AND TRANSACTING ENVIRONMENTAL OFFSETS

CROSS-REFERENCE TO RELATED APPLICATIONS

This application claims the benefit under 35 U.S.C. 119 (e) of U.S. Provisional Patent Application No. 61/903,174, filed Nov. 12, 2013 by Jordan Darragh for "Automated Computer Controlled Consumer Paper Measurement And Reforestation Transactional Systems and Methods", which patent application is hereby incorporated herein by reference.

BACKGROUND

Generally, businesses and large organizations consume large amounts of paper and other printer resources through the use of printers, printing presses, and other printing equipment. The consumption of these printer resources often have a depleting environmental impact. For example, a substantial portion of the trees harvested to make paper are not replaced, reducing forest acreage and perhaps ecosystem health. Additionally, ink, toner, and the electric power used to operate the printer may have an environmental impact that depletes the ecosystem. Some organizations alleviate the environmental impact by implementing one or more 'Reduce-Reuse-Recycle' programs. For example, billing internal departments for the number of pages printed by that department, or setting quotas, may encourage employees to reduce the number of pages they print. Newly emerging print management systems (PMS) can automatically track paper and toner usage for a fleet of printers linked to the PMS via API (Application Programming Interface). The PMS systems are designed to support internal billing and inventory control within a supply loop for the printer resource, and may be used to reduce resource consumption. However, reducing paper usage does not restore the environmental depletion that may have been caused by operating the printer.

In response to the above, other organizations attempt to 'Restore' the environment in proportion to the amount of the resources consumed, going beyond 'Reduce-Reuse-Recycle'. For example, a business may collect receipts for the paper they've used, calculate a standard tree equivalent (STE) by scaling the amount of paper used, and then fund a reforestation project which will plant an STE amount of trees on its behalf. However, setting up a restorative program like this may be time consuming and piecemeal to implement, requiring manual data collection, an oversimplified calculation of STE, and hand-selecting a reforestation project having nonstandard or unreliable certification. For example, the most common public domain formula for calculating the 'paper: tree' ratio equates 8,333 sheets of paper (8.5×11, 20 lb standard letter paper) to 1 tree (40 feet×7 inch diameter). Yet, a 131 foot Red Cedar tree made into newsprint through a 'groundwood' process will have a different scaling factor than a faster maturing 40 foot softwood tree made into office paper through a 'freesheet' process. Therefore, using a default STE scaling factor may result in a several-fold inaccuracy in predicting how much of an environmental offset to plant in a reforestation project.

Another solution to offsetting environmental depletion is offered by online calculators, such as http://turnpaperintotrees.com/. The user enters an amount of paper and the online calculator calculates an equivalent number of trees, which may be easier than using a manual calculator or spreadsheet. However, the online calculators may make assumptions about the paper type and weight, the species of tree, a survival rate of the trees planted on behalf of the paper user, or other parameters, resulting in an inaccurate environmental offset. Additional to the step of calculation, the user must still manually collect the consumption data and locate a reforestation project. Reforestation projects can be found online as well, and often present specifications and photographs about the project to a potential customer. However, the customer may be an employee new to reforestation and not have the time or experience to educate themselves enough to wisely choose one project over another. Unfortunately, online tools that calculate STE using average assumptions may be inaccurate. Further, selecting reforestation projects online without the help of associated educational information may lead to choosing projects that do not meet the customer green objectives.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided an automated computer controlled system for measuring the consumption of printer resources and transacting environmental offsets. The system may comprise a printer resource tracking system (PRTS) collecting resource consumption data from printing equipment communicating with the PRTS. A transactional server may retrieve the resource consumption data from at least one PRTS and store it in a memory. A consumed resource associated with a customer may be consumed by the printing equipment downstream of a supplier of the printer resources. At least one offset project may communicate with the transactional server and be capable of planting an environmental offset upstream of the supplier and thereby offset an environmental impact of the consumed resource. A scaling factor may be dependent on distinctive characteristics of at least one offset project. A calculator may apply the scaling factor to the consumed resource to calculate the environmental offset. A user interface may present to the customer an option to order the environmental offset from at least one offset project.

In another embodiment, there is provided a method of automatically measuring the consumption of printer resources and transacting environmental offsets, using a computer. The method may comprise collecting resource consumption data from printing equipment using a printer resource tracking system (PRTS) communicating with the printing equipment. The method may further comprise retrieving the resource consumption data from at least one PRTS using a transactional server having a processor and a memory. The method may further comprise storing the resource consumption data in the memory. The method may further comprise identifying a consumed resource consumed by the printing equipment and downstream of a supplier of the printer resource, the consumed resource being quantified in the resource consumption data and causing an environmental impact. The method may further comprise associating the consumed resource with a customer. The method may further comprise communicating by the transactional server with at least one offset project capable of planting an environmental offset upstream of the supplier. The method may further comprise depending a scaling factor on distinctive characteristics of the at least one offset project as distinguished from other offset projects. The method may further comprise applying the scaling factor to the consumed resource to calculate the environmental offset by using a calculator operating within the transactional server. The method may further comprise presenting a user interface to the customer with an option to order the environmental offset from the at least one offset project. The method may further comprise offsetting the environmental impact.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 6A-6C illustrate an exemplary customer dashboard of an automated system for transacting environmental offsets, in accordance with an embodiment of the present disclosure.

FIG. 9 is an exemplary conversion pricing dashboard of an automated system for transacting environmental offsets, in accordance with an embodiment of the present disclosure.

FIG. 13 is an exemplary customer management dashboard of an automated system for transacting environmental offsets, in accordance with an embodiment of the present disclosure.

DETAILED DESCRIPTION

Figure 1:
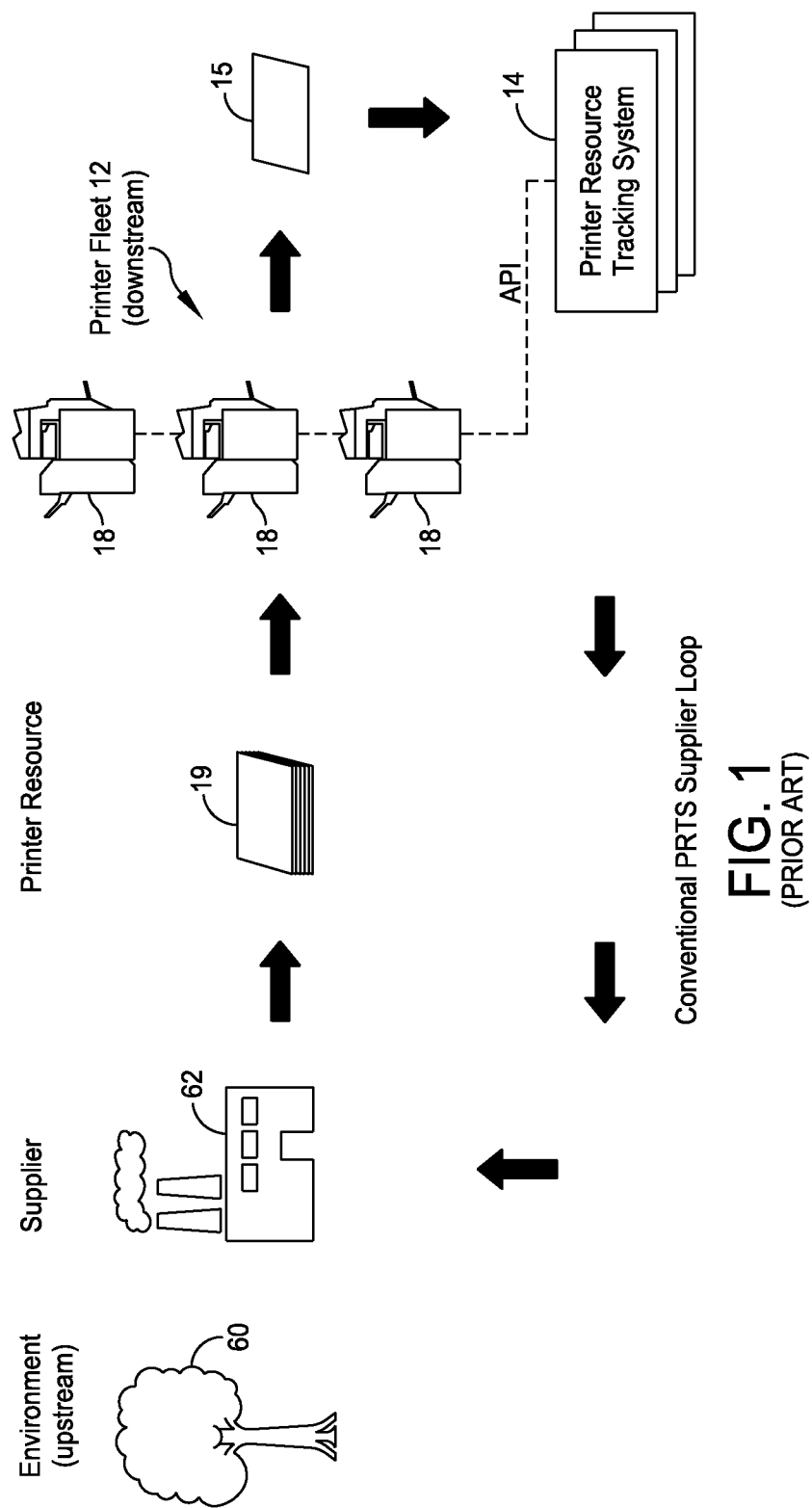
FIG. 1 illustrates the prior art where a print management system tracks printer resource consumption for internal billing and for inventory control within a supplier loop.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

As may be appreciated, based on the disclosure, there exists a need in the art for a system that electronically and automatically collects paper consumption data and facilitates the selection of reforestation projects that offset the paper consumed. Further, there exists a need in the art for an automated system that accurately calculates the scaling factor used to convert the consumed paper into fractional equivalent trees by taking into account resource-specific and project-specific parameters. In addition, there exists a need in the art for an automated system that shares the efforts of data collection, calculation, and ordering so that the "wheel isn't reinvented" each time a paper user seeks to install a restorative contribution to the environment. Also, there exists a need in the art for a system that reliable certifies the quality of work performed by a reforestation project. There also exists a need in the art for a system providing educational data related to the available reforestation projects so that a customer can choose an appropriate project for their organization. Finally, there exists a need in the art for tracking non-paper resource consumption and providing choices for planting accurate environmental offsets with offset projects that restore the environment upstream of the supplier of the consumed resources.

FIG. 1 shows a prior art example of how a printer resource tracking system 14 (PRTS) such as a print management system may be used to monitor and store resource consumption data (not shown) from printer fleet 12 comprised of printing equipment 18. A supplier 62 may produce printer resource 19 (paper supply) which may be utilized by printing equipment 18 to print a consumed resource 15 downstream from supplier 62. Print resource tracking system 14 may collect and store data via an application programming interface (API) and which may include a paper count, paper size, toner level, date, printer ID, location, and other parameters. The PRTS 14 may be operated locally by the users of printing equipment 18, by a printer OEM on behalf of the paper user (not shown) and located remotely, or by a 3$^{rd}$ party vendor in a central location. The data collected by the PRTS 14 may be confined to a supplier loop indicated by the black arrows and utilized for inter-departmental billing, inventory control, and/or initiating supplier orders.

Figure 2:
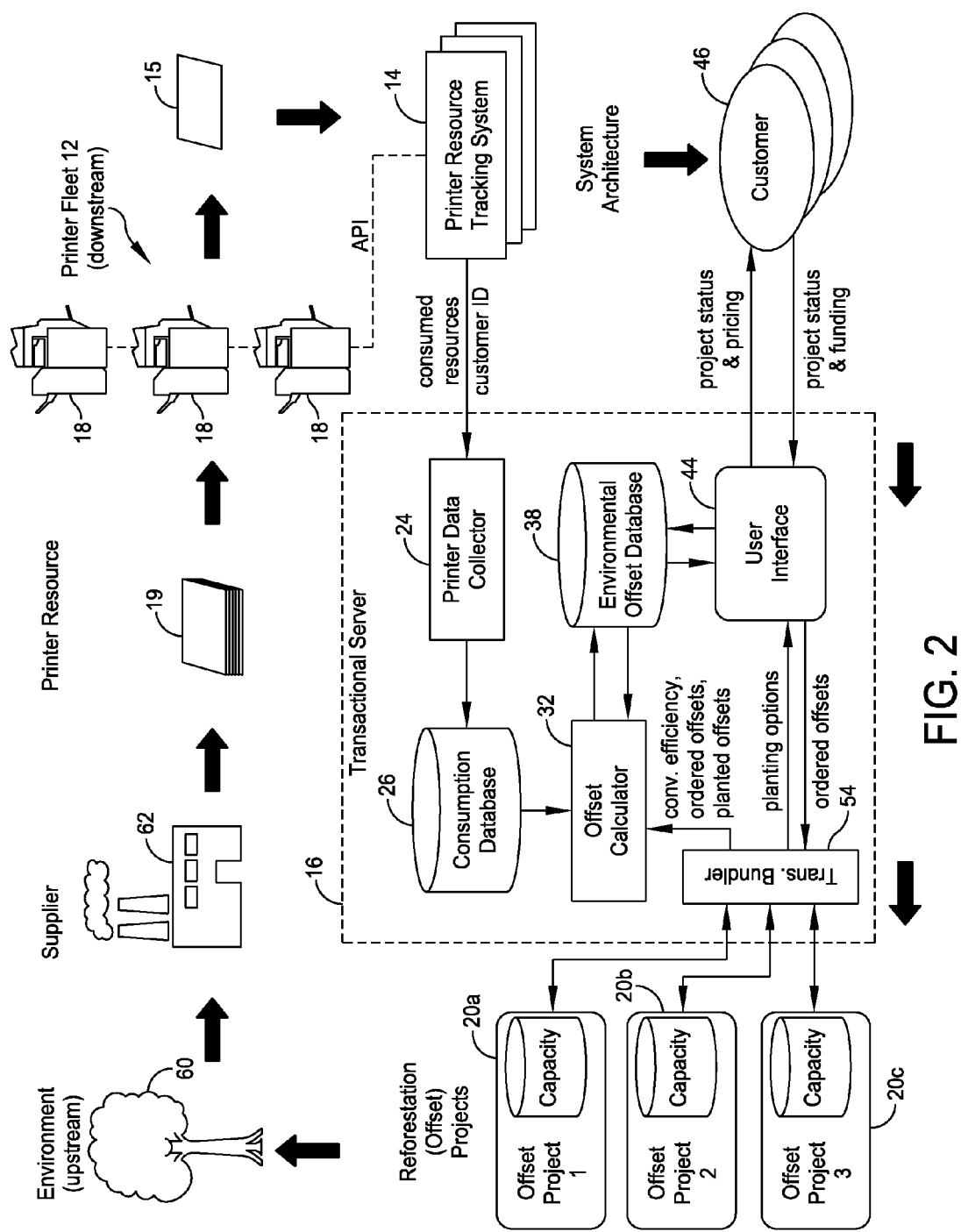
FIG. 2 illustrates the architecture of an automated system for transacting environmental offsets, in accordance with an embodiment of the present disclosure.

In an embodiment, referring to FIG. 2, an architecture for an automated system for transacting environmental offsets 10 may include printer data collector 24 retrieving resource consumption data (not shown) from printing equipment 18 via PRTS 14 and storing the data in consumption database 16. The PRTS 14 may be a print monitoring software, a printer OEM's meter/billing data, or a 3rd party's meter/billing data. Transactional server 16 may be integrated with PRTS 14 using API (Application Programming Interface) for retrieving the resource consumption data. Consumption database 26 may store quantity and specifications of consumed resource 15 such as paper count, paper size, paper weight, paper quality, recycled fiber content, customer ID, printer ID, and other parameters necessary to assign consumption to a customer. Consumed resource 15 may also be ink, toner, or electricity, and the related resource consumption data may record ink levels, toner levels, or kWh of electricity.

Continuing with FIG. 2, in an embodiment, offset calculator 32 may retrieve data associated with consumed resource 15 from consumption database 26 and apply scaling factors depending on the distinctive characteristics of one or more of reforestation (offset) projects 20 comprising offset projects 20a, 20b, and 20c, thereby calculating an environmental offset (not shown) and storing the result in environmental offset database 38. The scaling factor may be compounded from a conversion efficiency provided by the offset projects 20, specifications associated with the consumed resource 15 such as page size, default parameters provided internally by the system 10, and factors relating to the environmental offset strategy provided internally by the system 10 (see FIG. 8). The conversion efficiency provided by offset projects 20 may form an important part in determining an accurate scaling factor that is specific to the resource consumed and the offset project, resulting, for example, in a more accurate equivalency in tree count. Conversion efficiency may include a sapling survival rate, a tree dimension, a tree species, a tree growth rate, and/or an ecosystem productivity. For example, an offset project 20 having a lower sapling survival rate may require a larger over-planting effort in order to achieve an environmental offset equivalent to an offset project 20 having a higher sapling survival rate. (see FIG. 9).

Continuing, in an embodiment, an environmental offset strategy may include an internal scaling parameter taking into account the customer's restoration objectives. For instance, one offset strategy may be to replace lost trees by restoring original tree volume at some future date, which may be accomplished by a tree farm. Another strategy may be to restore healthy forest acreage including biological diversity. Other possible offset strategies include offsetting an atmospheric carbon load of the consumed resource 15 by planting biomass, offsetting an energy used to harvest and manufacture the printing resource 19 by generating renewable energy, and offsetting an energy used to operate the printing equipment 18 by generating renewable energy. Advantageously, by applying a scaling factor that is resource-specific and project specific, an automated system for transacting environmental offsets 10 may accurately adapt to changing knowledge about ecosystems and forests.

Continuing with FIG. 2, in an embodiment, default parameters provided internally by the system 10 may include standard values when a data value is not available, and may include a tree-to-pulp manufacturing efficiency. For example, a 'groundwood' process and a 'freesheet' process may vary in the amount of paper produced by a factor of two. Additionally, the paper quality that may be described in the resource consumption database 26 may affect the scaling factor needed to obtain an accurate STE. Therefore, system 10 may provide a calculator 32 which provides improved accuracy over online calculators and standard assumptions for STE equivalency.

The environmental offset may be an amount of a restorative process planted or installed by one more offset projects 20 located upstream 60 of supplier 62. Each offset project 20 may maintain a record of available capacity for planting environmental offsets and may update transactional server 16 as necessary. For example, offset calculator 32 may retrieve a page count for customer A from consumption database 26 and a conversion efficiency from offset project 20a and may calculate an equivalent tree count for offsetting the environmental impact of the pages consumed by customer A, and then assign, or order, that equivalent tree count to be planted at project 20a. Alternately, offset project 20a may be a renewable energy generator, consumed resource 15 may be kWh of electricity consumed by printing equipment 18, supplier 62 may be a power plant, and offset calculator 32 may calculate an environmental offset in the form of kWh of renewable energy to be planted or installed by offset project 20a.

In an embodiment, referring still to FIG. 2, offset calculator 32 may compare data associated with consumed resource 15 to data retrieved from environmental database 38 and determine whether an environmental offset has already been calculated for consumed resource 15. Offset Calculator 32 may also compare ordered offsets and planted offsets imported from offset projects 20 to data associated with consumed resource 15 and determine whether an environmental offset has already been calculated for consumed resource 15, where an ordered offset is an environmental offset that has been ordered (assigned) by customer 46 to be planted by an offset project 20, and a planted offset is an environmental offset that has been ordered and planted (installed) by an offset project 20. Additionally, the status of an environmental offset that has been ordered or planted may be updated accordingly in environmental offset database 38. Should a parameter needed for determining a scaling factor not be available, such as paper size missing from the printer consumption data, a default value (e.g. 8.5 in.×11 in.) may be substituted for use by the calculator.

Figure 6A:
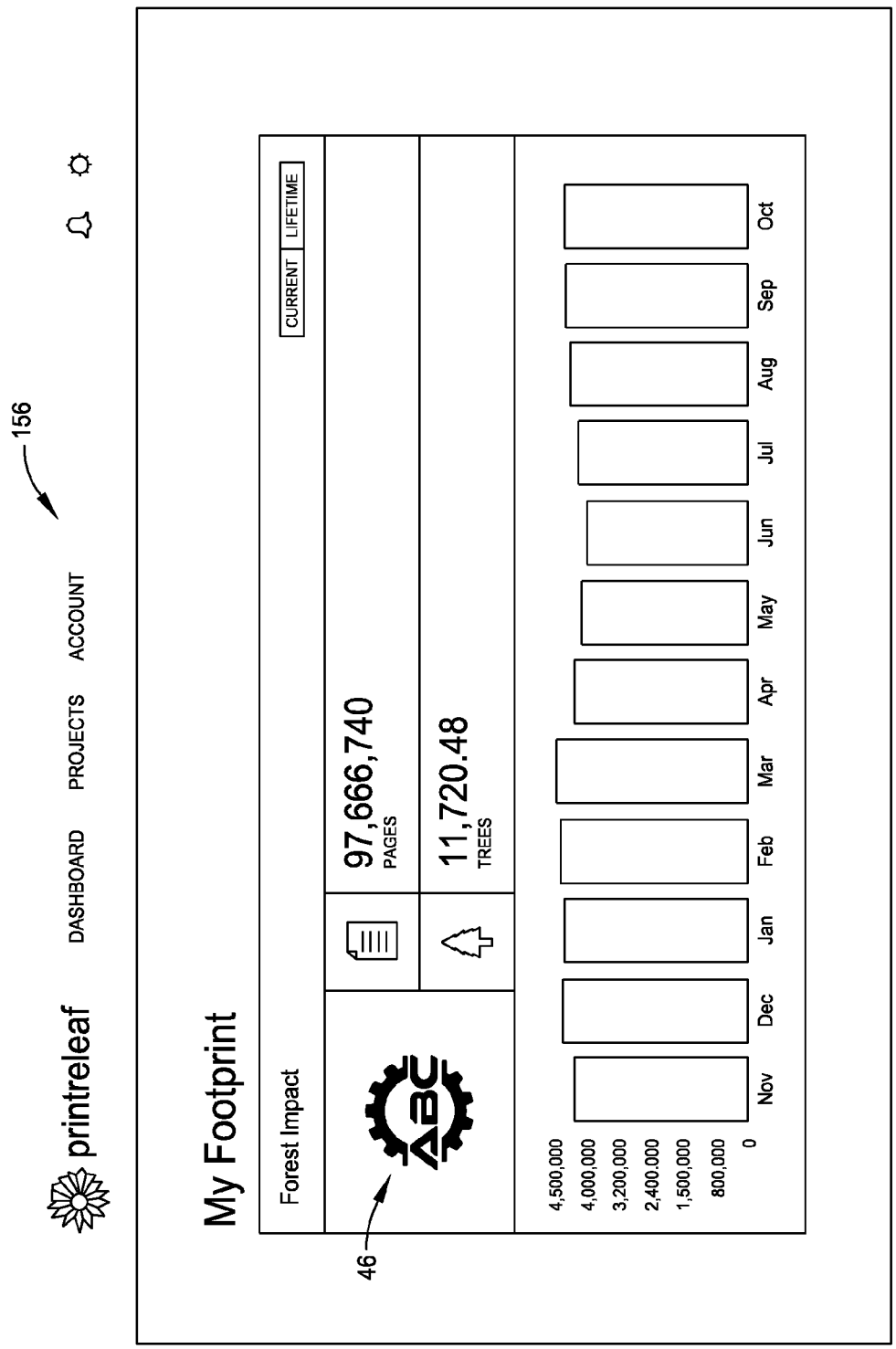
Figure 6B:
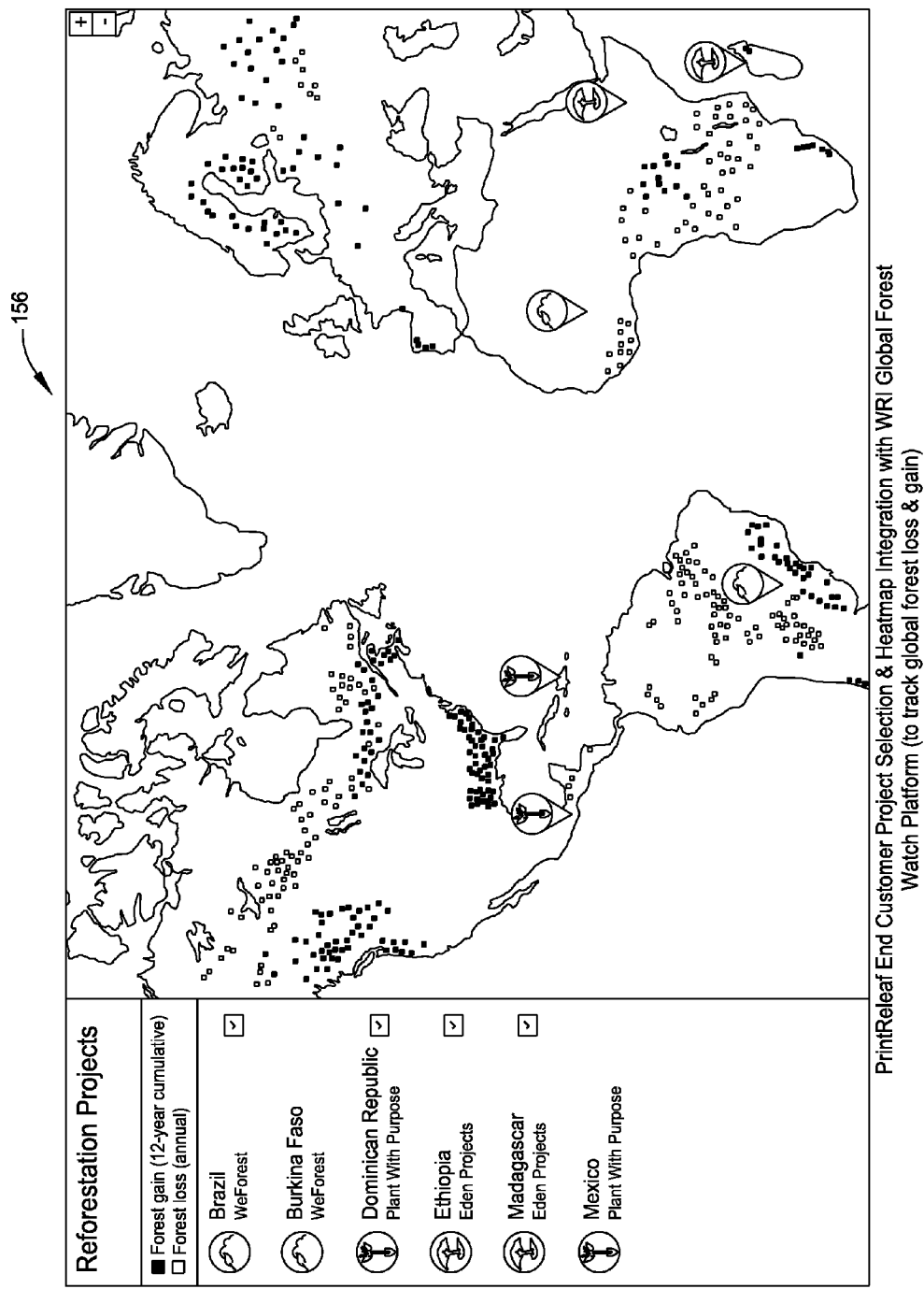

Customer 46 may access user interface 44 importing data from environmental offset database 38 for viewing the paper footprint and equivalent trees associated with consumed resource 15 wishing to be assigned, and may also view historical data for customer 46 (see FIGS. 6A-6C). Customer 46 may also access user interface 44 for viewing the status, available capacity (offset project capacity), and pricing information related to offset projects 20, including the status of ordered offsets. Transactional server 16 may deliver to customer 46, through user interface 44, contextual data giving context to descriptions of the status of projects 20, where the contextual data may comprise forest maps from Global Forest Watch, cultural data, environmental data, and economic data in order to assist customer 46 is selecting an offset project 20. Once customer 46 has chosen where to assign environmental offsets associated with consumed resource 15, orders may be placed to the chosen offset projects.

Alternatively, instead of the user interface 44 retrieving pre-calculated offsets, customer 46 may select the desired projects 20 first and trigger environmental offsets to be calculated 'on the fly', where offset calculator 32 retrieves updated offset project capacity (not shown) and conversion efficiency from the selected offset projects 20, calculates environmental offsets for new (unscaled) data associated with consumed resource 15, and delivers the environmental offsets to user interface 44 for confirmation by customer 46. If there is insufficient capacity in a selected offset project 20 to plant the environmental offset, the customer may select another project 20 and trigger a recalculation of options. Should project status indicate that some ordered offsets have not yet been planted, customer 46 may elect to move those offsets to another project, depending on agreements operating within the automated system for transacting environmental offsets 10.

Continuing with FIG. 2, in an embodiment, transaction bundler 54 may aggregate and hold multiple customer 46 orders until an ordering threshold 170 (FIG. 5) and/or maximum delay 172 (FIG. 5) have been exceeded, then permit the order to flow through to offset projects 20, thereby reducing the number of transactions required (and associated accounting overhead). Customer 46 may schedule future orders through user interface 44 based on expected resource consumption or by spreading out the offsetting of consumption that has already occurred. Other methods of bundling customer orders may include transacting orders associated with particular customers immediately, or assigning different delays or volumetric thresholds based on project, customer, time of year, or projections of future orders. Alternately, transaction bundler may be omitted and a project interface (not shown) substituted to interface between offset projects 20 and transactional server 16. More details on the operation of transaction bundler 54 are included below in the description of FIG. 5.

Additionally, in an embodiment, a common $3^{rd}$-party certification party may be enlisted for system 10 to uniformly verify that all offset projects are planting correctly and maintaining a steady conversion efficiency. Such uniform certification may create wide acceptance for and customer confidence in an automated system for transacting environmental offsets 10, and lead to improved methods and dialogue among all partners.

Figure 3:
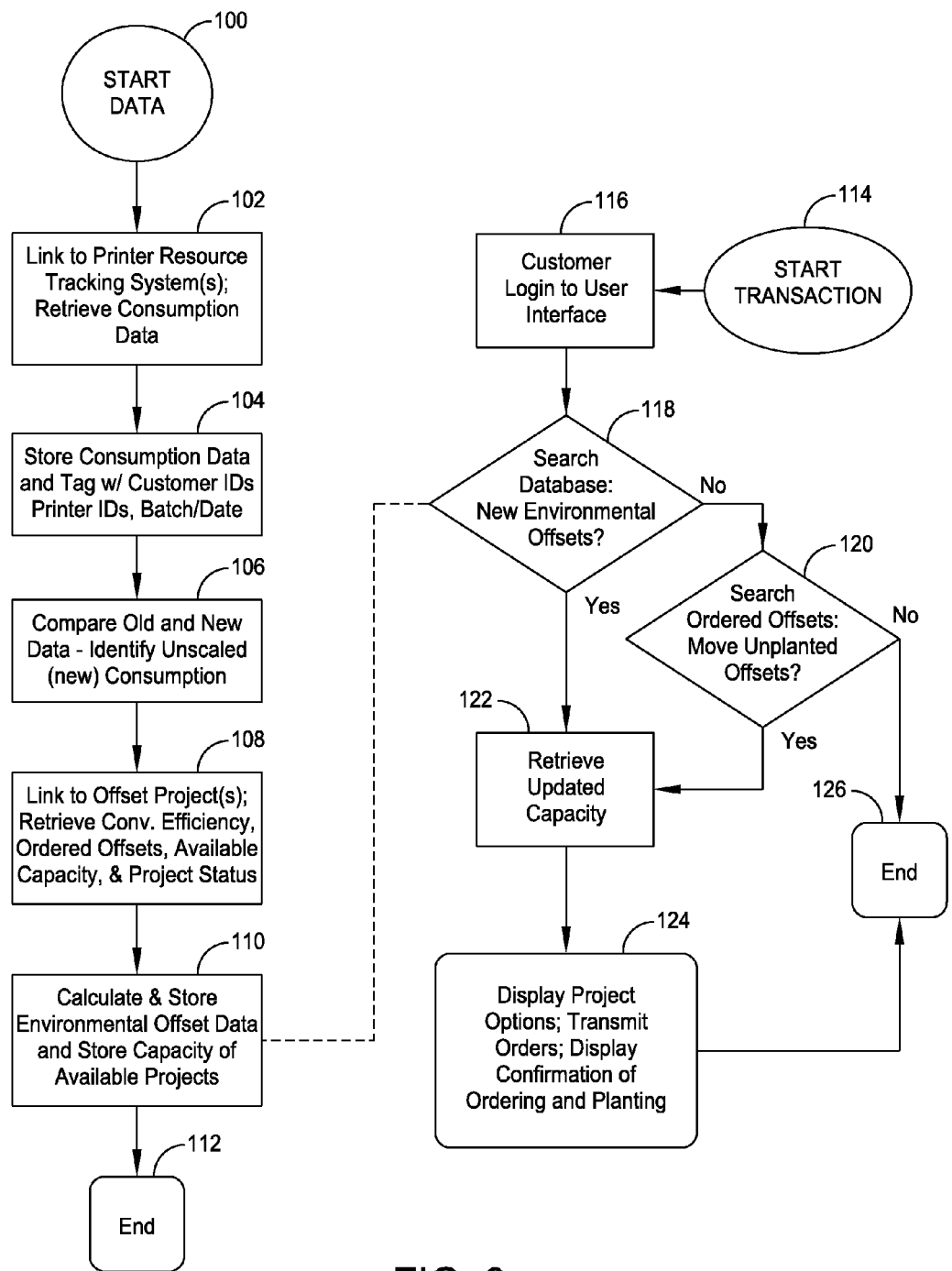
FIG. 3 illustrates the computer flowchart of an automated system for transacting environmental offsets, in accordance with an embodiment of the present disclosure.

Referring to FIGS. 2 and 3, in an embodiment, a computer flowchart for an automated system for transacting environmental offsets 10 may be divided into steps for calculating an environmental offset and steps for a ordering an environmental offset. Starting at step 100, step 102 may link transactional server 16 to the printer resource tracking system (PRTS) 14 and retrieve resource consumption data. Next, step 104 may store the resource consumption data in consumption database 26, and may tag an amount of consumed resource 15 with a batch/date, customer ID and/or printer ID. The amount of consumed resource 15 may be a page count, a page size, kWh of electrical energy, ink volume, toner volume, or other consumption that a customer wants to offset.

Continuing with FIG. 3, Step 106 may compare old and new consumption data to determine which, if any, has yet to be converted into an environmental offset. Step 108 may link the transactional server 16 to offset projects 108 and may retrieve a conversion efficiency in order to derive a scaling factor, and may retrieve ordered offsets, planted offsets, and offset project capacity so that the calculator 32 may apply scaling factors only to resource consumption data that has yet to be ordered or planted while making sure the offset project 20 has enough capacity to support the environmental offset associated with consumed resource 15. Step 108 may also retrieve an updated project status so that a customer 46 may view status information at user interface 44. Finally, step 110 may calculate, using calculator 32, environmental offsets for consumed resources 15, and may store the results in environmental offset database 38. The offset project capacity may also be stored in step 110, ending at step 112.

Continuing with FIGS. 2 and 3, in an embodiment, starting with step 114, a customer 46 may log into user interface 44 in step 116. In step 118, environmental offset database 38 may be searched for new offsets associated with customer 46 and which have not yet been ordered or planted. If there are no new environmental offsets, step 120 may offer customer 46 an option to re-assign an ordered offset to another project 20. If there are offsets to be assigned or moved, step 122 may retrieve offset project capacity and may display options to customer 46 for ordering and confirming a transaction with one or more offset projects 20 having available capacity. If step 120 finds no unplanted offsets to move, or if customer 46 is finished with the session at user interface 44, the assignment process may be ended at step 126.

Alternately, referring to FIG. 3, in an embodiment, environmental offsets may be pre-calculated and retrieved by customer 46 via user interface 44, or environmental offsets may be calculated 'on the fly' only for projects that customer 46 is interested in, triggering the required data. Multiple customers 46 may access multiple user interfaces 44 at different locations and connect to multiple offset projects 20, spreading the costs of an automated system for transacting environmental offsets 10 over many customers, offset projects, and data partners, and aggregating a wealth of information and options in one place.

Figure 4:
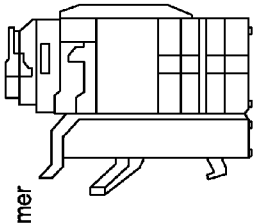
FIG. 4 is an exemplary consumption data display of an automated system for transacting environmental offsets, in accordance with an embodiment of the present disclosure.

Referring to FIG. 4, in an embodiment, printer resource consumption data display 150 may be a dashboard displaying resource consumption data from printing equipment 18 showing page count for different toner colors, toner levels, customer ID, printer type, location, meter reads, and other parameters useful in calculating environmental offsets for consumed resource 15. To isolate recent consumption, previous readings for a consumed resource 15 may be subtracted from current readings of consumed resource 15 to get new unscaled data. Alternately, consumed resources 15 may be stored periodically and charted by day or hour. Data display 150 may be accessed by administrative portals, portals for data providers, and/or customer portals, depending on permissions and privacy settings (not shown).

Figure 5:
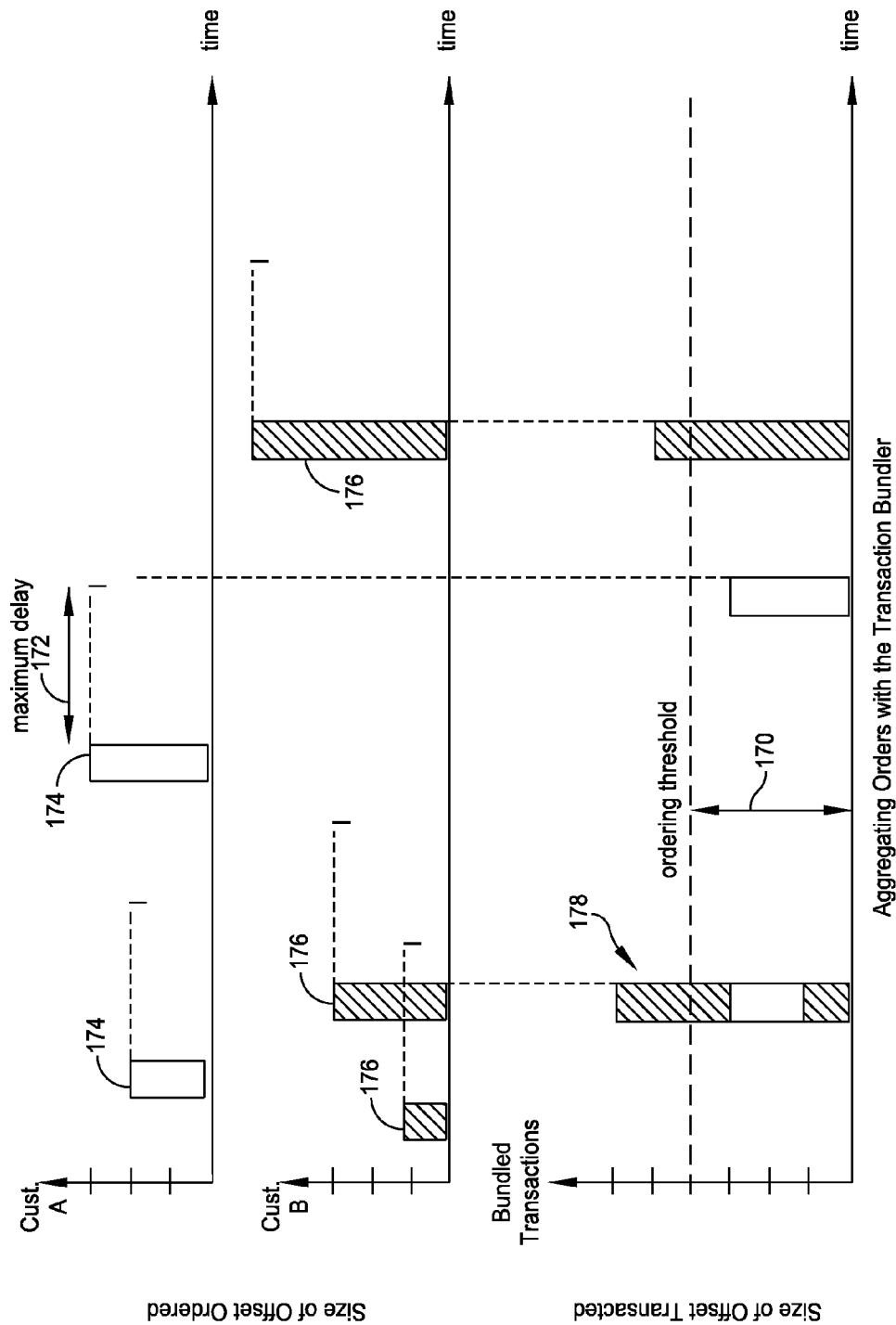
FIG. 5 illustrates a graph of the transaction bundler in an automated system for transacting environmental offsets, in accordance with an embodiment of the present disclosure.

Referring to FIG. 5, in an embodiment, a graph of transaction bundler 54 may illustrate the way customer orders may be aggregated into bulk orders for reducing the number of transactions required between transactional server 16 and offset projects 20. In an embodiment, an ordering threshold 170 may be set for a particular offset project 20. In the first transaction, ordering threshold 170 is set at four units, and customer A's first order 174 of two units combines with customer B's first two orders 176 of one and three units to trigger a bundled transaction 178 of six units within maximum time delay 172 assigned to each order. In the second transaction, customer A's order 174 of three units may wait for delay 172 and be finally transacted when no other orders follow. In the third transaction, customer B's order 176 of five units may be immediately transacted since the order size is greater than ordering threshold 170. Other methods of bundling customer orders may include transacting orders associated with particular customers immediately, or assigning different delays or volumetric thresholds based on project, customer, time of year, or projections of future orders.

Referring to FIGS. 6A-6C, in an embodiment, customer dashboard 156 may be accessed by customer 46 though user interface 44 for viewing the paper consumed and equivalent trees (environmental offset) for customer 46. Customer dashboard 156 may display environmental offsets waiting to be assigned and offsets already assigned. Reforestation projects which are active with planted orders for customer 46 may be displayed, or reforestation projects eligible for assignment of unassigned environmental offsets may be displayed. Other pages of the dashboard 156 may allow the customer 46 to access contextual data such as maps of forest gain and loss offered by Global Forest Watch, or to place offset orders with various reforestation projects 20. Payment procedures may be offered through dashboard 156, and confirmation of received orders may be received from selected projects 20.

Figure 7:
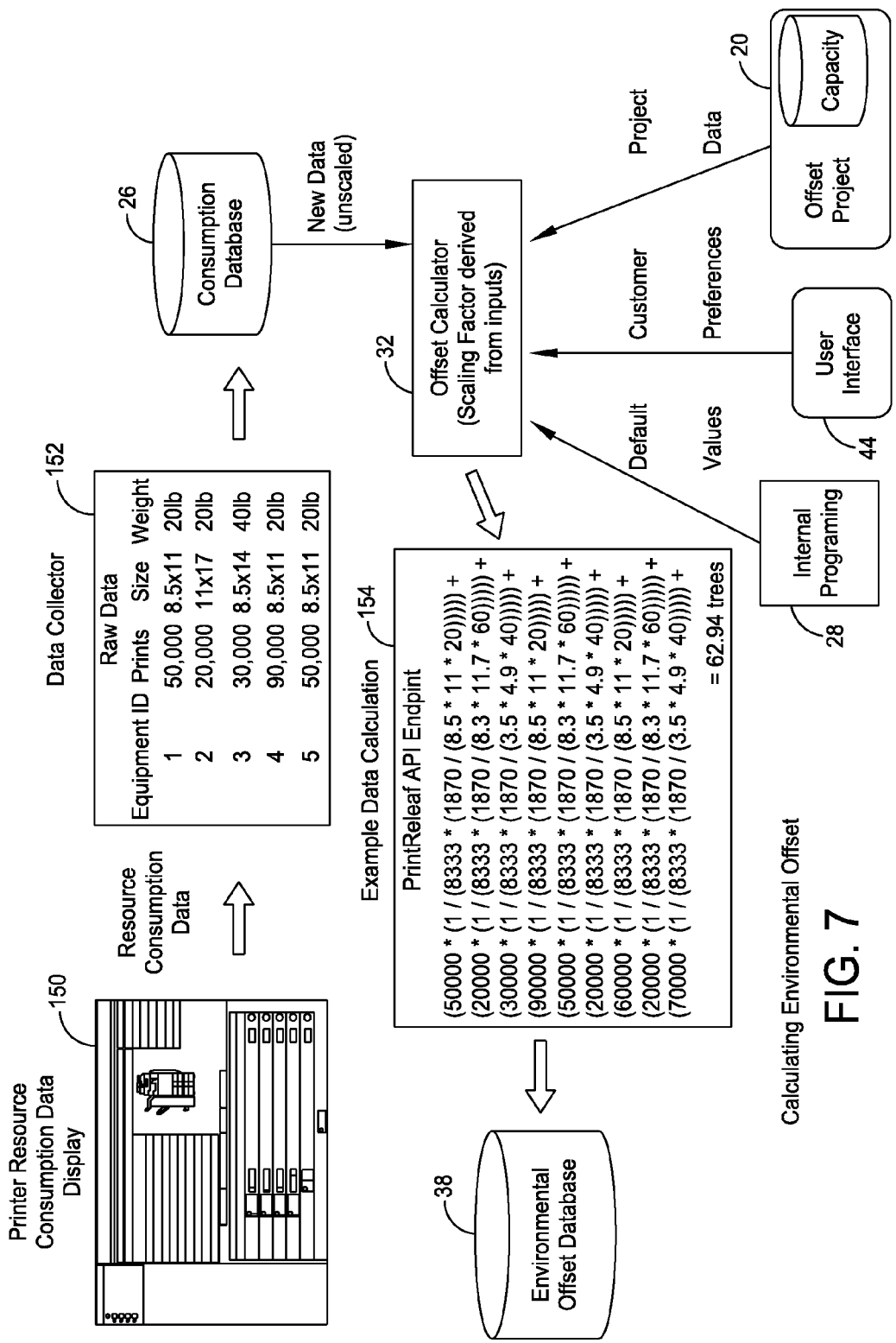
FIG. 7 illustrates a calculation diagram for an automated system for transacting environmental offsets, in accordance with an embodiment of the present disclosure.
Figure 8:
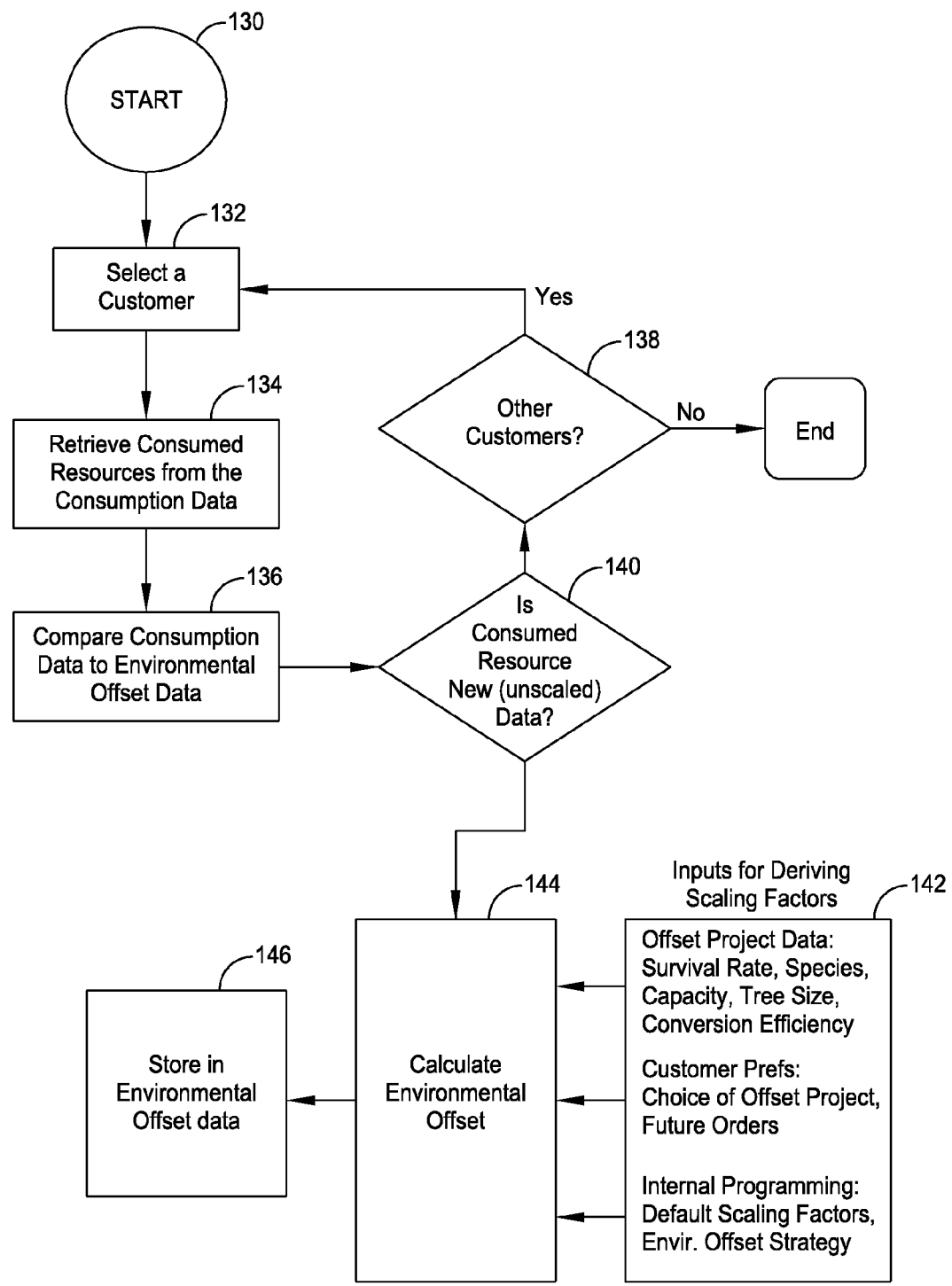
FIG. 8 illustrates the calculator flowchart for an automated system for transacting environmental offsets, in accordance with an embodiment of the present disclosure.

Referring to FIGS. 7 and 8, in an embodiment, shown is an example calculation and a calculator flowchart. Starting at step 130 in FIG. 8, transactional server 16 (not shown) may select a customer in step 132. Step 134 may retrieve data associated with consumed resources 15 (FIG. 2) for that customer and by its originating printer as shown in printer resource consumption data display 150. Raw data 152 may be the usable portions of printer data 150 as collected by printer data collector 24 (FIG. 2) and stored in consumption database 26. Step 136 may compare consumption data for the customer to existing environmental offset data. Step 140 may pass new (unscaled) data to offset calculator 32 if the data is new and otherwise proceed to step 138 if the data for that customer is old. Step 138 determines if there are other customers to be processed within the resource consumption data, ending if not, and returning to step 132 if there are other customer's data to process.

Continuing with FIG. 8, in an embodiment, in step 144, calculator 32 may collect inputs 142 for deriving scaling data from offset projects 20, user interface 44, and internal programming 28 internal to transaction server 16. Inputs 142 from the offset project may include offset project capacity, conversion efficiency, and the dependents of conversion efficiency including survival rate, tree species, tree size, tree growth rate, and ecosystem productivity. Inputs from the customer 46 via user interface 44 may include choice of offset project, future offsets desiring to be ordered, and customer preferences. Inputs 142 from internal programming 28 may include default parameters, tree-to-pulp manufacturing efficiency, and/or factors related to an environmental offset strategy. In step 144, offset calculator 32 calculates an environmental offset which may appear as seen in example data calculation 154. Step 146 may store the environmental offset in environmental database 38.

Referring to FIG. 9, in an embodiment, a conversion pricing dashboard 160 may be available in whole or in part to customers 46, transactional system administrators, and/or project 20 personnel. Conversion pricing dashboard 160 may depict the relationship between conversion efficiency and STE price (last column), where conversion efficiency of offset project 20 may depend on survival rate ($3^{rd}$ column), tree species ($2^{nd}$ column), and tree width and height. Each row may represent a project location and associated offset project name ($1^{st}$ column). STE price may be approximately inversely proportional to survival rate, and lower survival rates may require over-planting or purchasing more STE units in order to plant the environmental offset ordered by the customer.

Figure 10:
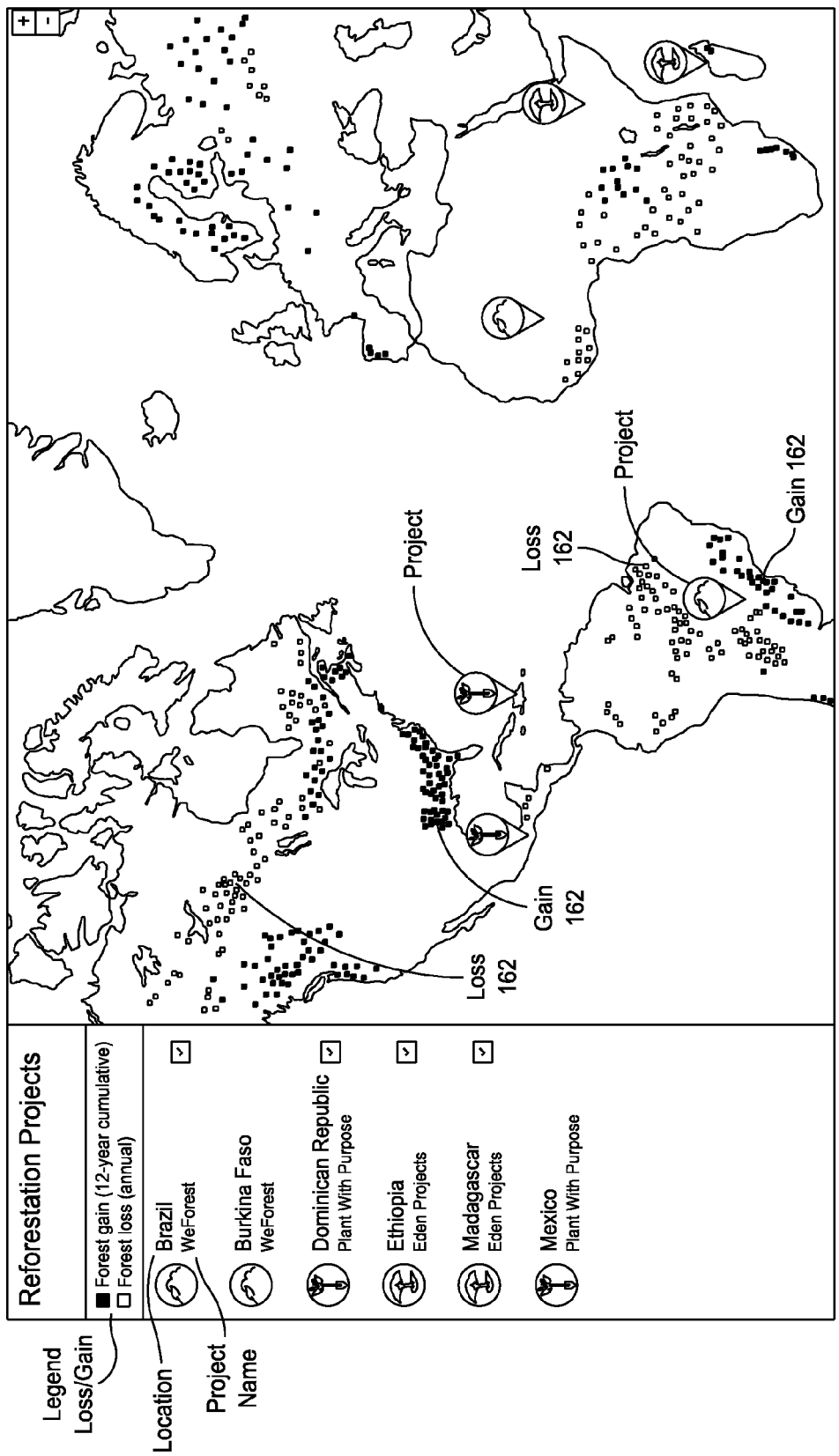
FIG. 10 is an exemplary contextual data dashboard of an automated system for transacting environmental offsets, in accordance with an embodiment of the present disclosure.

Referring to FIG. 10, in an embodiment, contextual data may be provided to the customer via user interface 44 to aid in deciding which offset project to order from. For example, maps provided by Global Forest Watch may be included in the automated system for transacting environmental offsets, along with other educational materials. When combined with project status for an offset project, a customer new to reforestation may view cultural, economic, and ecological data such as this gain/loss map in order to make a more informed decision in selecting projects for assigning environmental offsets.

Figure 11:
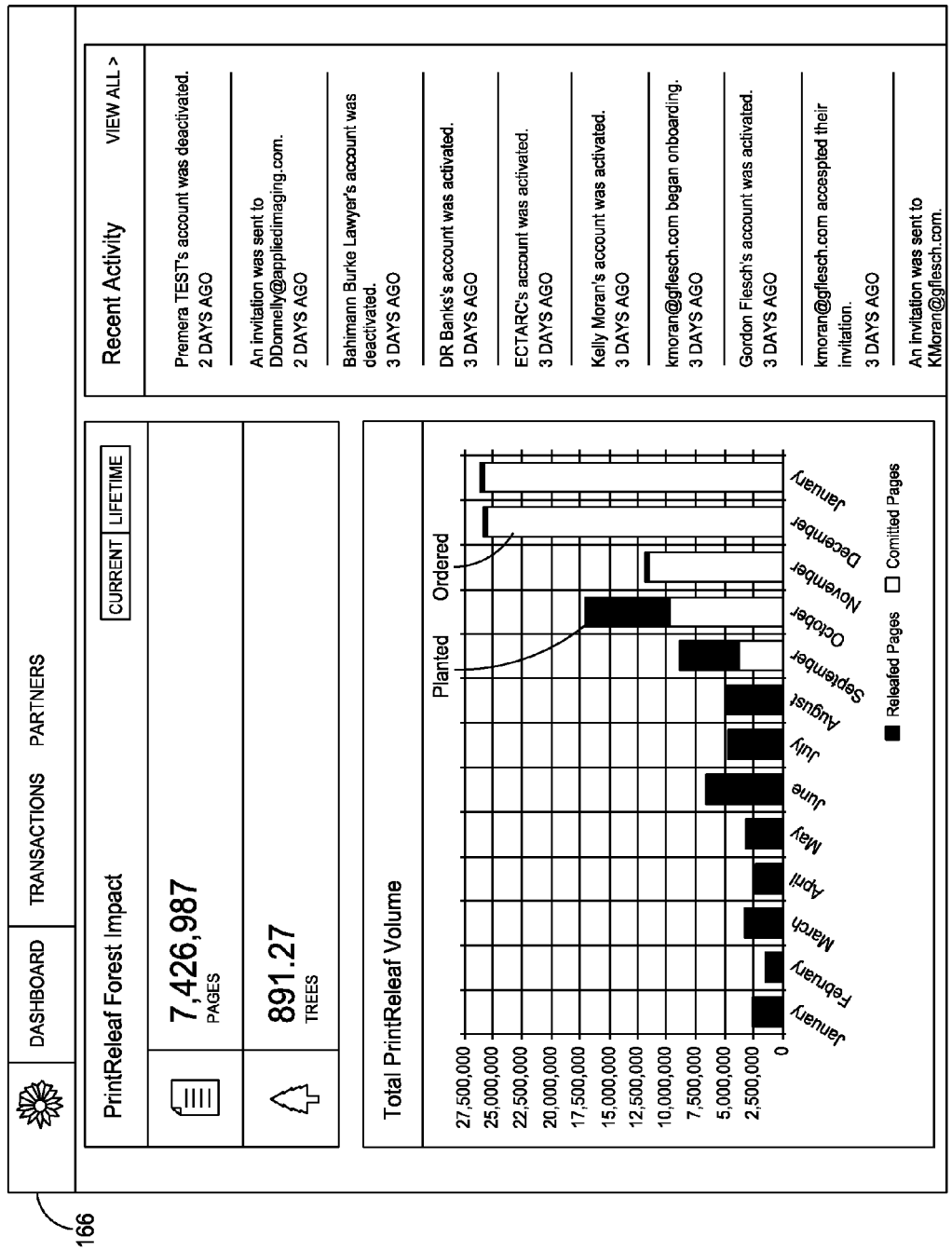
FIG. 11 is an exemplary administrative dashboard of an automated system for transacting environmental offsets, in accordance with an embodiment of the present disclosure.

Referring to FIG. 11, in an embodiment, an administrative dashboard showing future commitments may include a graph of cumulative offsets for paper volume planted over time, and may include future orders scheduled but not yet planted. Combined with transaction bundler 54, having a planned timing for future orders may enhance the ability of transacting system 10 to level throughput, reduce the number of transactions, and reduce cost and complexity. The right column may display recent activity for customers, data providers, offset projects, and/or correspondence and which may help evaluate system operation and predict future loading.

Figure 12:
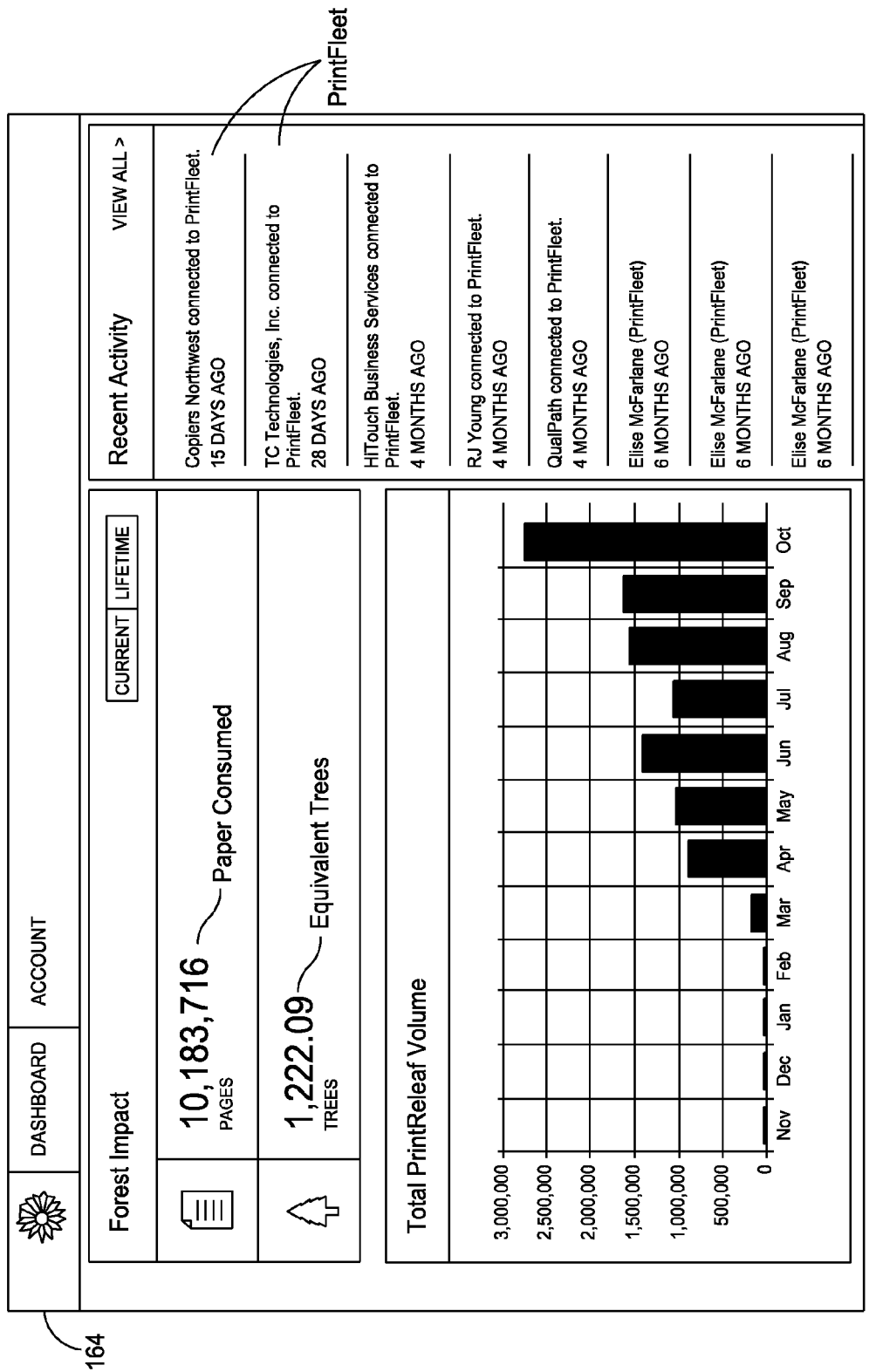
FIG. 12 is an exemplary data provider dashboard of an automated system for transacting environmental offsets, in accordance with an embodiment of the present disclosure.

Referring to FIG. 12, in an embodiment, data provider dashboard 164 may display cumulative volume for printer fleet 12 (FIG. 2) and its equivalent in trees for a particular data provider, and may display a graph of paper consumed by month. A data provider may be a paper user (customer), printer OEM, or $3^{rd}$ party vendor operating a printer management system or having possession of meter/billing data or a printer resource tracking system.

Referring to FIG. 13, in an embodiment, customer management administrative portal 158 may summarize customer status by data provider ($2^{nd}$ column), cumulative pages ($3^{rd}$ column), and activity category. Alternatively, other parameters may be summarized, such as tree equivalents, kWh or environmental offset, inception date, future orders, Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. An automated computer controlled system for measuring the consumption of printer resources and transacting environmental offsets, comprising:
    a printer resource tracking system (PRTS) collecting resource consumption data from printing equipment communicating with the PRTS;
    a transactional server having a processor and a memory, the transactional server retrieving the resource consumption data from at least one PRTS and storing it in the memory;
    a consumed resource associated with a customer and quantified in the resource consumption data, the consumed resource being consumed by the printing equipment downstream of a supplier of the printer resource;
    at least one offset project communicating with the transactional server and capable of planting an environmental offset upstream of the supplier and thereby offsetting an environmental impact of the consumed resource, the at least one offset project providing communication to the transactional server to provide conversion efficiency information for the at least one offset project to the transactional server;
    a scaling factor dependent on distinctive characteristics of the at least one offset project as distinguished from other offset projects;
    a calculator operating within the transactional server and calculating the environmental offset by applying the scaling factor to the consumed resource; and
    a user interface presenting to the customer an option to order the environmental offset from the at least one offset project.

2. The system of claim 1, wherein:
    the PRTS is at least one of a print monitoring software, a printer OEM's meter/billing data, a 3rd party's meter/billing data.

3. The system of claim 1, wherein:
    the transactional server is integrated with the PRTS using API (Application Programming Interface) for retrieving the resource consumption data.

4. The system of claim 1, wherein:
    the resource consumption data is a paper consumption data, the consumed resource is paper, the offset project is a reforestation project, and the environmental offset is the planting of trees.

5. The system of claim 4, wherein:
    the paper consumption data includes a paper count and at least one of a paper size, a paper weight, a paper quality, a recycled fiber content.

6. The system of claim 1, further comprising:
    a transaction bundler interfacing with the offset projects and aggregating a plurality of environmental offsets ordered by at least one customer into one transaction once an ordering threshold is reached, thereby reducing the number of transactions required.

7. The system of claim 1, further comprising:
    a conversion efficiency substantially proportional to the environmental offset provided by at least one offset project, where the scaling factor is dependent on the conversion efficiency.

8. The system of claim 7, wherein:
    the conversion efficiency is dependent on at least one of the following determinants: a sapling survival rate, a tree dimension, a tree species, a tree growth rate, an ecosystem productivity.

9. The system of claim 1, wherein:
    the scaling factor is dependent on at least one of the following objectives: offsetting an atmospheric carbon load of the consumed resource by planting biomass, offsetting an energy used to harvest and manufacture the printing resource by generating renewable energy, offsetting an energy used to operate the printing equipment by generating renewable energy.

10. The system of claim 1, further comprising:
    an offset project capacity updating to the server and defining a maximum capacity of the offset project to plant the environmental offset ordered by the customer.

11. The system of claim 1, further comprising:
    a contextual data delivered to the user interface and giving context to a description of the offset project, where the contextual data includes at least one of forest maps from Global Forest Watch, cultural data, environmental data, and economic data.

12. The system of claim 1, further comprising:
    a common certification party uniformly verifying the environmental offset of the offset projects.

13. The system of claim 1, further comprising:
    an option for the customer to schedule the ordering of the environmental offsets at future dates through the user interface.

14. A method of automatically measuring the consumption of printer resources and transacting environmental offsets, using a computer, comprising:
    collecting resource consumption data from printing equipment using a printer resource tracking system (PRTS) communicating with the printing equipment;
    retrieving the resource consumption data from at least one PRTS using a transactional server having a processor and a memory;
    storing the resource consumption data in the memory;
    identifying a consumed resource consumed by the printing equipment and downstream of a supplier of the printer resource, the consumed resource being quantified in the resource consumption data and causing an environmental impact;
    associating the consumed resource with a customer;
    communicating by the transactional server with at least one offset project capable of planting an environmental offset upstream of the supplier, the at least one offset project providing communication to the transactional server to provide conversion efficiency information for the at least one offset project to the transactional server;
    depending a scaling factor on distinctive characteristics of the at least one offset project as distinguished from other offset projects;
    applying the scaling factor to the consumed resource to calculate the environmental offset by using a calculator operating within the transactional server;

presenting a user interface to the customer with an option to order the environmental offset from the at least one offset project; and offsetting the environmental impact.

15. The method of claim 14, wherein:

the PRTS is at least one of a print monitoring software, a printer OEM's meter/billing data, a 3rd party's meter/billing data.

16. The method of claim 14, wherein:

the transactional server is integrated with the PRTS using API (Application Programming Interface) for retrieving the resource consumption data.

17. The method of claim 14, wherein:

the resource consumption data is a paper consumption data, the consumed resource is paper, the offset project is a reforestation project, and the environmental offset is the planting of trees.

18. The method of claim 17, wherein:

the paper consumption data includes a paper count and at least one of a paper size, a paper weight, a paper quality, a recycled fiber content.

19. The method of claim 14, further comprising:

bundling a plurality of environmental offsets ordered by at least one customer into one transaction once an ordering threshold is reached, thereby reducing the number of transactions required, said bundling accomplished through a transaction bundler interfacing with the offset projects.

20. The method of claim 14, further comprising:

basing the scaling factor on a conversion efficiency substantially proportional to the environmental offset provided by at least one offset project.

21. The method of claim 20, wherein:

the conversion efficiency is dependent on at least one of the following determinants: a sapling survival rate, a tree dimension, a tree species, a tree growth rate, an ecosystem productivity.

22. The method of claim 14, wherein:

the scaling factor is dependent on at least one of the following objectives: offsetting an atmospheric carbon load of the consumed resource by planting biomass, offsetting an energy used to harvest and manufacture the printing resource by generating renewable energy, offsetting an energy used to operate the printing equipment by generating renewable energy.

23. The method of claim 14, further comprising:

reporting an offset project capacity to the transactional server, the offset project capacity defined as a maximum capacity of the offset project to plant the environmental offset ordered by the customer.

24. The method of claim 14, further comprising:

delivering a contextual data to the user interface giving context to a description of the offset project, where the contextual data includes at least one of forest maps from Global Forest Watch, cultural data, environmental data, and economic data.

25. The system of claim 14, further comprising:

uniformly verifying the environmental offset of the offset projects using a common certification party.

26. The method of claim 14, further comprising:

providing an option for the customer to schedule the ordering of the environmental offsets at future dates through the user interface.

\* \* \* \* \*